Aug. 29, 1967      W. C. BECKER ET AL      3,338,404
OPENING MEANS FOR PLASTIC FILM ENCASED PACKAGE CONSTRUCTIONS
Filed March 16, 1965      4 Sheets-Sheet 1

INVENTORS
WILLIAM C. BECKER
JOHN L. ENDERS

BY *Glenn, Palmer & Matthews*

THEIR ATTORNEYS

Aug. 29, 1967  W. C. BECKER ET AL  3,338,404
OPENING MEANS FOR PLASTIC FILM ENCASED PACKAGE CONSTRUCTIONS
Filed March 16, 1965  4 Sheets-Sheet 3

INVENTORS
WILLIAM C. BECKER
JOHN L. ENDERS
BY Glenn, Palmer
& Matthews
THEIR ATTORNEYS Aug. 29, 1967  W. C. BECKER ET AL  3,338,404
OPENING MEANS FOR PLASTIC FILM ENCASED PACKAGE CONSTRUCTIONS
Filed March 16, 1965  4 Sheets-Sheet 4

INVENTORS
WILLIAM C. BECKER
JOHN L. ENDERS
BY
THEIR ATTORNEYS

United States Patent Office 3,338,404
Patented Aug. 29, 1967

3,338,404
OPENING MEANS FOR PLASTIC FILM ENCASED PACKAGE CONSTRUCTIONS
William C. Becker, Henrico County, Va., and John L. Enders, Fullerton, Calif., assignors to Reynolds Metals Company, Richmond, Va., a corporation of Delaware
Filed Mar. 16, 1965, Ser. No. 440,179
6 Claims. (Cl. 206—65)

ABSTRACT OF THE DISCLOSURE

This disclosure relates to package constructions each comprising product-filled open-ended receptacle means encased in a heat shrunk tubular film-like member to tightly compact and hold the product means and receptacle means together, each package construction having means for easily tearing through the film-like member to open the same for product removal purposes. The tearing means for the film-like member can comprise tear string means between the film-like member and the product-filled receptacle means or perforations and the like in the film-like member itself.

---

This invention relates to an improved means for opening a novel package construction as well as to an improved method of making such an opening means for the package construction or the like.

In particular, it is well known that package constructions can be formed by placing desired product means in the open end of receptacle means and encasing the filled receptacle means in a tubular film-like member which is subsequently heat shrunk to provide an integral and stabilized package construction by the heat shrunk tubular member compacting the product means and receptacle means together, the heat shrunk film-like member having opposed open ends through which the receptacle means can be utilized as handle means to carry the package construction.

Such prior known package construction is fully disclosed and claimed in the co-pending patent application, Ser. No. 366,424, filed May 11, 1964, abandoned after having been refiled Aug. 2, 1966, as a continuation application, Ser. No. 573,749.

According to the teachings of this invention, improved means are provided for permitting the merchandiser or ultimate consumer to readily and easily open the above described package constructions in the unique and novel manner without utilizing auxiliary opening devices.

Accordingly, it is an object of this invention to provide an improved package construction having one or more of the novel features of this invention as set forth above or hereinafter shown or described.

Another object of this invention is to provide an improved method of making such a package construction or the like.

Other objects, uses and advantages of this invention are apparent from a reading of this description which proceeds with reference to the accompanying drawings forming a part thereof and wherein.

Figure 1:
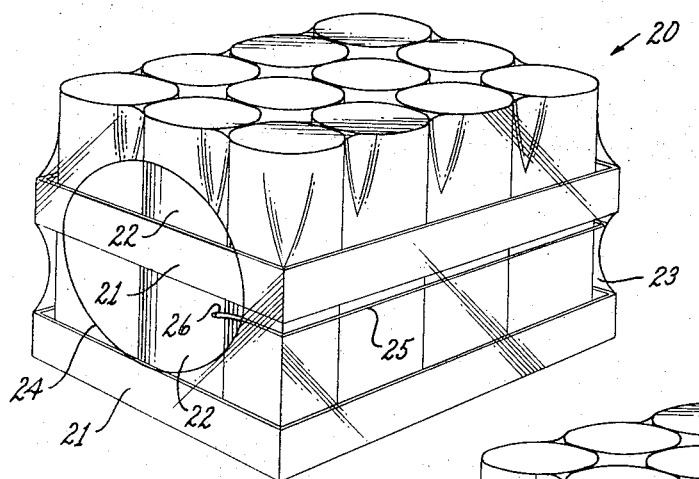
FIGURE 1 is a perspective view of the improved package construction of this invention.

While the various features of this invention are hereinafter described and illustrated as being particularly adaptable to provide package constructions for cylindrical container bodies or the like, it is to be understood that the various features of this invention can be utilized singly or in any combination thereof to provide package constructions for other product means as desired.

Therefore, this invention is not to be limited to only the embodiments illustrated in the drawings, because the drawings are merely utilized to illustrate one of the wide variety of uses of this invention.

Referring now to FIGURE 1, an improved package construction of this invention is generally indicated by the reference numeral 20 and comprises a plurality of open ended substantially rectangular tray-like receptacles 21 each being filled with a plurality of cans or product means 22, the filled receptacle means 21 being disposed in stacked relation and being encased in a heat shrunk tubular film-like member 23 which holds the package construction 20 together in a stabilized manner. The film-like member 23 has opposed open ends 24 which overlap the opposed ends of the filled receptacles 21 and readily expose one of the tray-like means 21 so that the same can be manually grasped by the merchandiser or ultimate consumer to transport the same.

For further details of the structure and advantages of the package construction 20, see the aforementioned co-pending patent application.

However, the package construction 20 of this invention further includes a tear string or tape 25 secured to the interior surface of the film-like tubular member 23 and having at least one end 26 thereof extending beyond an adjacent end 24 of the tubular member 23 to provide a grasping means for the tear string 25.

Figure 2:
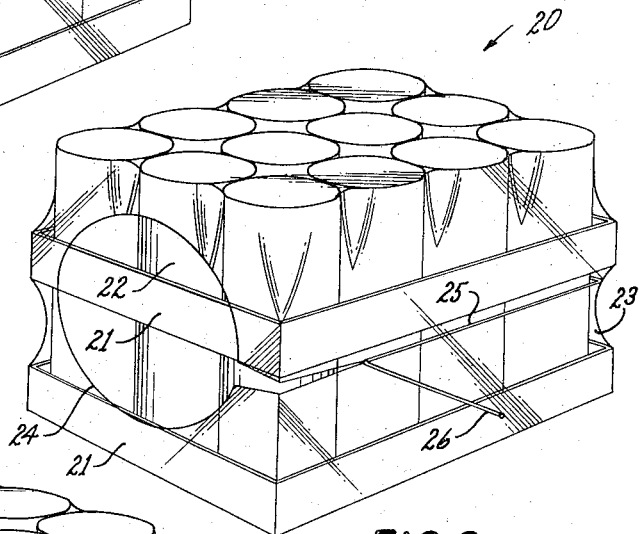
FIGURE 2 is a view similar to FIGURE 1 and illustrates the package construction in its partially opened position.

In this manner, the merchandiser or ultimate consumer can readily grasp the end 26 of the tear string 25 at the open end 24 of the film-like tubular member 23 and pull outwardly on the same to completely sever through the film-like material 23 in the manner illustrated in FIGURE 2 from one end 24 to the other end 24 of the tubular member 23 to open the package construction 20 whereby the severed tubular film-like member 23 can readily be unwrapped from the filled receptacle means 21 for any desired purpose.

One method for forming the package construction 20 previously described is fully illustrated in FIGURES 3–6.

In particular, the heat shrinkable film-like material 23 is provided in sheet form 27 and the tear string 25 is adapted to be disposed across the same and secured thereto by adhesive means or the like either randomly or in a pre-selected position thereon so that when the sheet of material 27 is subsequently wrapped entirely around the filled receptacle means 21 in the manner illustrated in FIGURE 9 to have the opposed ends 28 and 29 thereof disposed in overlapping relation and heat sealed together by a heat sealing bar 30, the tear string 25 will have at least one or both ends 26 thereof extending beyond the end of the tubular member 23.

Figure 6:
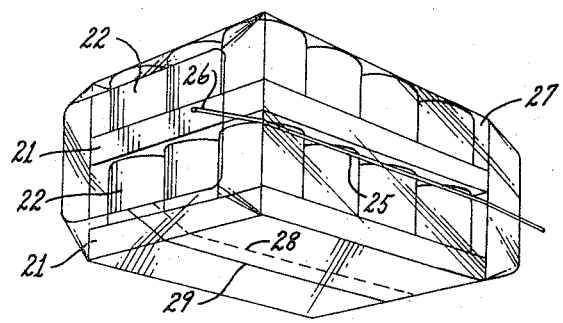

Subsequently, the opposed ends of the tubular member 23 are preshrunk in the manner illustrated in FIGURE 6 so that the ends partially surround the opposed ends of the filled receptacles 21. Thereafter, the entire package construction of FIGURE 6 is passed through a heating chamber or the like wherein the film-like material 23 is completely heat shrunk around the filled receptacle means 21 to provide the finished package construction 20 illustrated in FIGURE 1.

Therefore, it can be seen that the package construction 20 of this invention readily permits the user to open the same in a simple and effective manner without requiring auxiliary opening means therefor.

While the package construction 20 can be formed of any suitable material and in any suitable manner, the embodiment thereof illustrated in the drawings has the receptacle means 21 thereof formed from cardboard while the heat shrinkable material 23 can be polyethylene, polypropylene or the like wherein the same has the heat shrinking or resilient characteristic to tightly compact the product means 22 and receptacle means 21 together to provide a stabilized package construction.

However, it has been found that when the film-like material 23 is formed of polyvinylchloride, the same has a relatively good impact resistance.

For example, the film-like material 23 can be formed of two webs of oriented polyvinylchloride fused together to provide a lamination suitable for the features of this invention.

The tear string 25 can comprise string, cord, plastic, wire, monofilament or any other suitable material and can be secured to the film-like material 23 by solvent, adhesive means or the like.

While the package construction 20 as well as the package constructions illustrated respectively in FIGURES 8–11 are illustrated as having two filled receptacle means 21, it is to be understood that each of the package constructions of this invention can have one or more filled receptacles 21 as desired.

Figure 7:
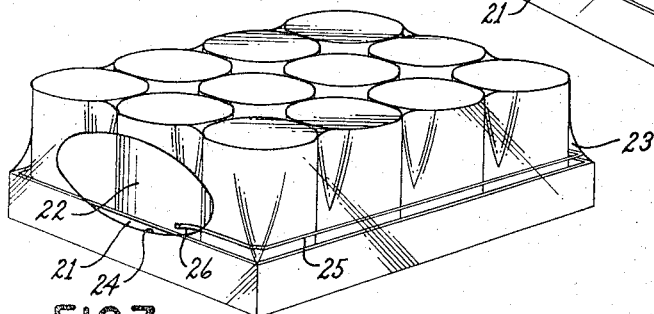
FIGURE 7 is a view similar to FIGURE 1 and illustrates another embodiment of this invention.

For example, another receptacle of this invention is generally indicated by the reference numeral 31 in FIGURE 7 and comprises a single receptacle means 21 having the product means 22 disposed therein and the tubular film-like member 23 heat shrunk around the same, the package construction 31 including the tear string 25 having a free end 26 exposed at the opening 24 in the film-like member 23 to permit the package construction 31 to be opened in the same manner as the package construction 20 illustrated in FIGURES 1 and 2.

If desired, the tear string of this invention need not extend completely around the tubular member from one opposed end to the other opposed end as the same could be utilized to tear a small portion of the film-like member to provide a tear therein which can be manually torn thereafter to free the film-like material.

Figure 8:
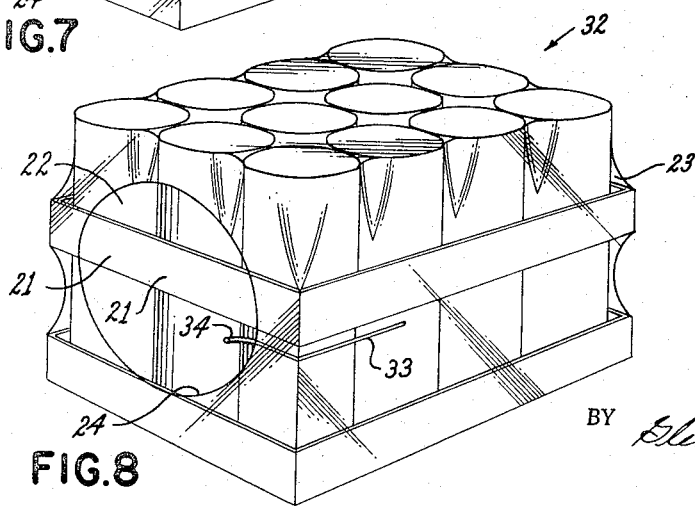
FIGURE 8 is a view similar to FIGURE 1 and illustrates another embodiment of this invention.
Figure 3:
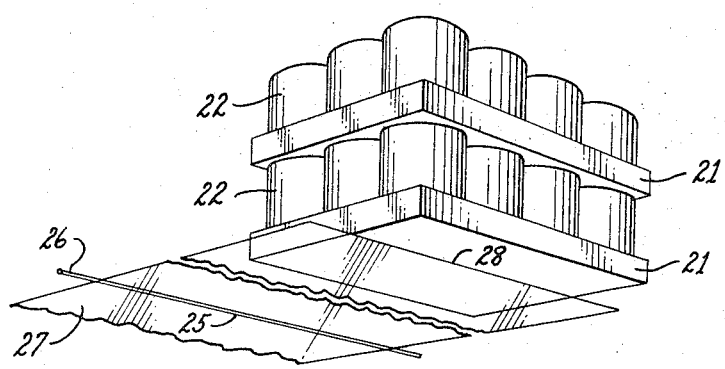
FIGURES 3–6 are perspective views respectively illustrating the method of forming the package construction of FIGURE 1.
Figure 4:
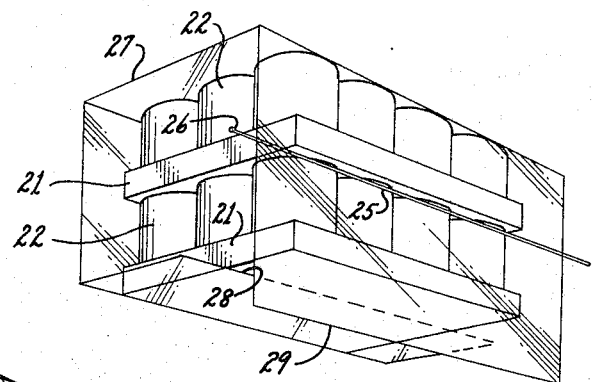
Figure 5:
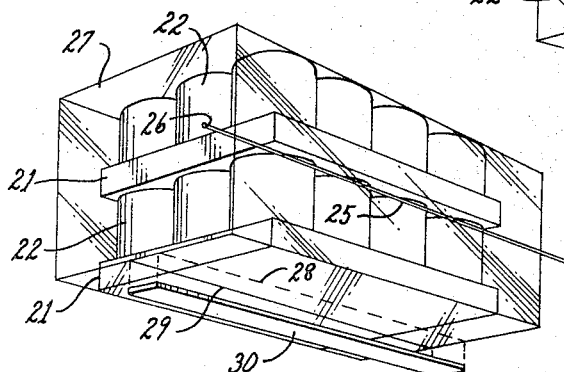

For example, another package construction of this invention is generally indicated by the reference numeral 32 in FIGURE 8 and comprises the filled and stacked receptacle means 21 being encased in the heat shrunk film-like material 23 in the manner previously described.

However, a short tear string or tab 33 is secured to the inside surfaces of the film-like material 23 and has a free end 34 exposed at one of the ends 24 of the film-like material 23, the tear string or tab 33 only extending along the interior surface of the package construction of the film-like material 23 a relatively short distance as illustrated in FIGURE 8.

In this manner, the ultimate consumer can grasp the free end 34 of the tear string 33 and pull the same outwardly to sever the film-like material 23 at the end 24 throughout the length of the tear string 33 whereby a tear will have been started in the film-like material 23 which can be increased in length by the ultimate consumer merely running his finger from the initial tear in the film-like material 23 to the other opposed end 24 thereof.

If desired, the tear string need not be secured to the interior surface of the film-like material as the same could be readily secured to one or more of the product means 22 to produce the same result as provided by the tear string 33 previously described.

Figure 9:
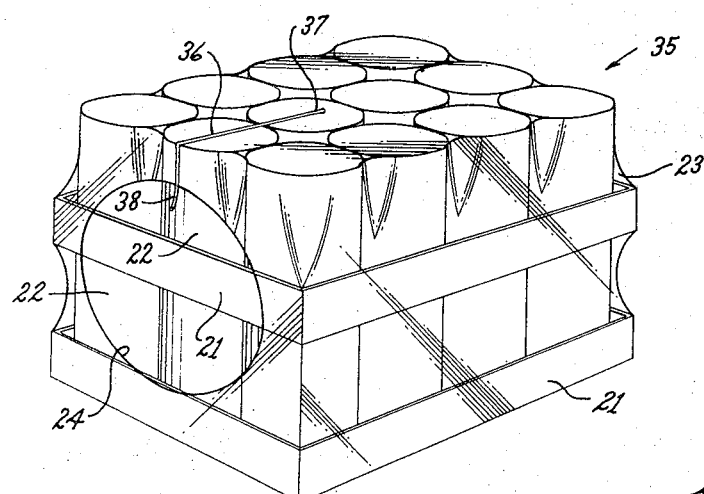
FIGURE 9 is a view similar to FIGURE 1 and illustrates another embodiment of this invention.

For example, reference is made to FIGURE 9 wherein another package construction of this invention is generally indicated by the reference numeral 35 and comprises a plurality of stacked receptacle means 21 filled with the product means 22 and being completely encased in the heat shrunk tubular film-like material 23 in the manner previously described.

However, a tear string 36 is provided and has one end 37 thereof secured to one of the upper product means 22 in the manner illustrated in FIGURE 9 whereby the other end 38 of the tear string 36 is exposed at the open end 24 of the tubular member 23.

In this manner, the ultimate consumer can grasp the end 38 of the tear string 36 and pull upwardly on the same to tear through the film-like material 23 at the end 24 thereof to the point where the tear string 38 is secured to the particular product means 22 whereby the initial tear through the film-like material 23 can be increased in length manually by the ultimate consumer running his finger from the initial tear toward the other end 24 off the film-like material 23.

Figure 10:
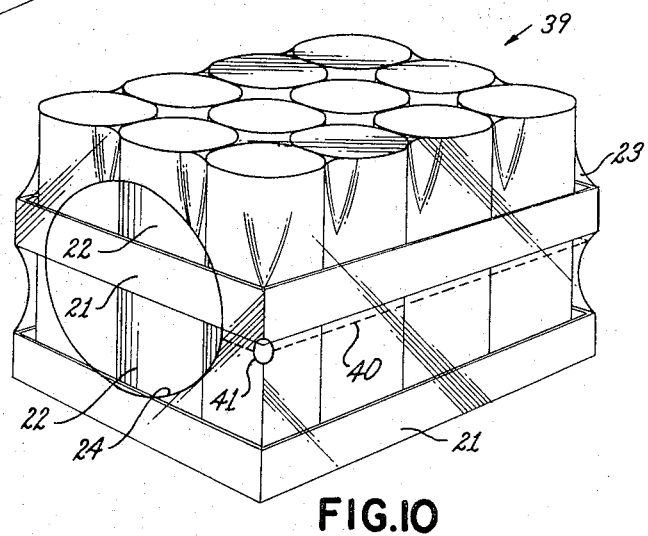
FIGURE 10 is a view similar to FIGURE 1 and illustrates another embodiment of this invention.

Another package construction of this invention is generally indicated by the reference numeral 39 in FIGURE 10 and comprises a plurality of stacked receptacle means 21 filled with the product means 22 and being encased in the heat shrunk tubular film-like member 23.

The tubular film-like member 23 is perforated along a line 40 from one end 24 thereof to the other end 24 in the manner illustrated in FIGURE 10 and has one or more large openings 41 provided therein adjacent an end 24 of the tubular member 23 and aligned with the perforations 40.

In this manner, the ultimate consumer or merchandiser can insert a finger in an opening 41 and move the finger toward the opposed end 24 to break the film-like material 23 between the perforations 40 so that the film material 23 can be opened in the manner previously described.

While the tear string 25 for the container construction 20 of FIGURE 1 has been described as being secured to the interior surface of the film-like material 23 by adhesive means or the like, it is to be understood that a suitable tear string could be provided which could be sewed to the film-like material 23 and have tab means on one or both opposed ends thereof so that the ultimate consumer or merchandiser can readily and simply open the package construction.

Figure 11:
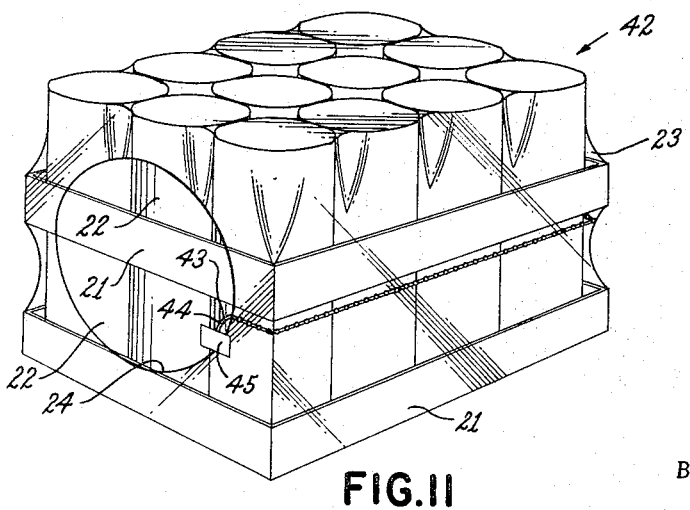
FIGURE 11 is a view similar to FIGURE 1 and illustrates another embodiment of this invention.

For example, reference is made to FIGURE 11 wherein another package construction of this invention is generally indicated by the reference numeral 42 and comprises a plurality of stacked tray-like receptacles 21 filled with product means 22 and being encased by the heat shrunk tubular film-like member 23. However, the tubular member 23 has a tear string 43 sewn thereon from one end 24 of the tubular member 23 to the other end 24 thereof. At least one end 44 of the tear string 43 extends beyond one of the ends 24 of the tubular member 23 and has a tab 45 secured thereon whereby the ultimate consumer or merchandiser can grasp the tab 45 and pull outwardly on the string 43 to completely sever the film-like material 23 from one end 24 thereof to the other end 24 thereof so that the package construction 42 can be simply and effectively opened.

Therefore, it can be seen that this invention not only provides improved package constructions having improved easy open means therefor, but also this invention provides improved methods of making such package constructions or the like.

While the tear strings and perforations previously described can be located in any desired position relative to the particular package construction, it can be seen that when the same are located between adjacent receptacles 21 in the manner illustrated in the drawings, the film-like material 23 at this location is spaced from the product means 22 so that a finger can readily run along the film-like material 23 to tear the same after the initial tear has been made in the above manner or the finger has been received in an opening 41.

However, it may be found that when the package constructions of this invention are disposed in side-by-side stacks, the opening means of FIGURES 1, 10 and 11 would not be readily available for the intermediate top package constructions.

Figure 12:
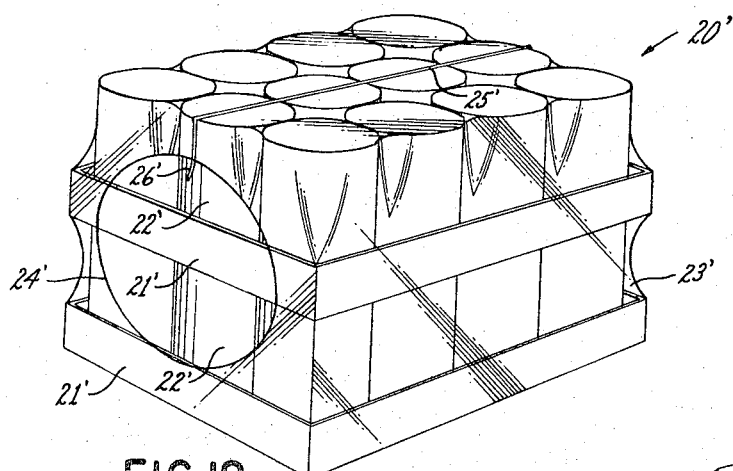
FIGURES 12, 13 and 14 are respectively views similar to FIGURES 1, 10 and 11 but illustrate the easy opening means thereof extending across the top of the package construction rather than around the sides thereof.
Figure 13:
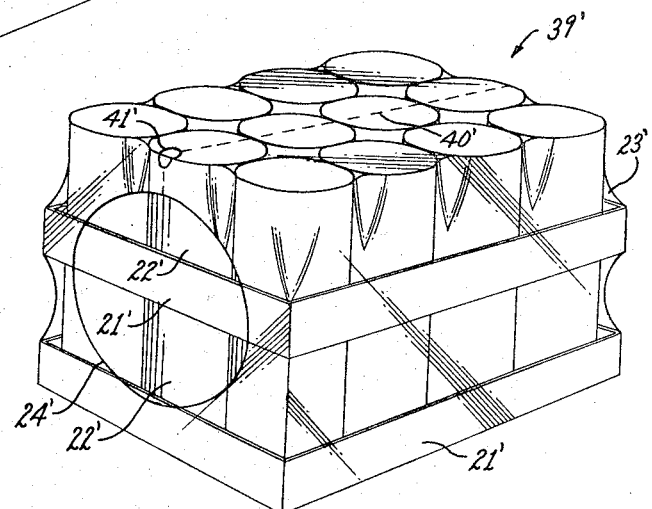
Figure 14:
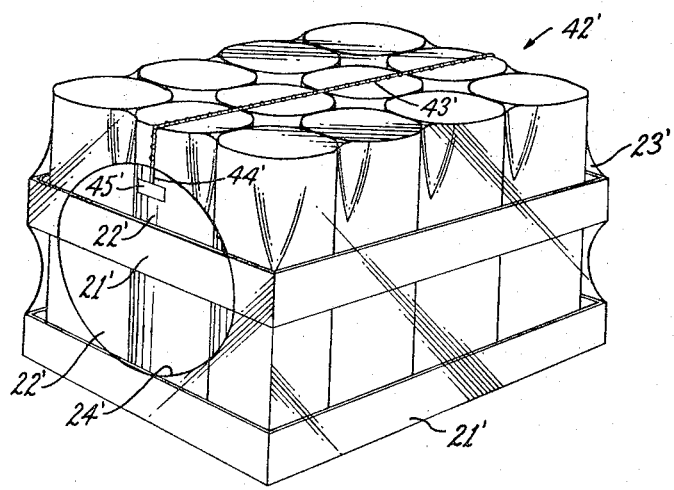

Therefore, the easy opening means of FIGURES 1, 10 and 11 could extend across the top of the respective package construction as fully illustrated in FIGURES 12, 13 and 14 wherein like parts are indicated by like reference numerals followed by a prime mark.

In this manner, it can be seen that the package constructions of FIGURES 12, 13 and 14, as well as of FIGURE 9, can be readily opened across the top thereof even though side space limitations are placed thereon.

While the form of the invention now preferred has been disclosed as required by the statutes, other forms may be used, all coming within the scope of the claims which follow.

What is claimed is:

1. In combination, open ended receptacle means filled with product means, and a tubular film-like member receiving said filled receptacle means to hold said receptacle means and said product means together, said film-like member having means to permit tearing of said film-like member at least partially across the same to provide easy open means for said tubular film-like member, said last-named means comprising a tear string means having one end secured to one of said product means and having the other end exposed at one of the ends of said film-like member to be grasped and pulled relative to said film-like member.

2. In combination, a plurality of open top receptacles each having a bottom wall and upwardly extending side walls at the outer periphery of said bottom wall, said receptatcles having the open ends thereof receiving product means to be supported on the bottom walls of the receptacles having the open ends thereof receiving product walls thereof, said filled receptacles being placed in stacked relation, and a heat shrunk tubular film-like member receiving said stacked and filled receptacles to hold said receptacles and product means together, said film-like member having means to permit tearing of said film-like member at least partially and substantially longitudinally across the same at a point below and adjacent the bottom wall of an upper receptacle to provide easy open means for said tubular film-like member at a location where said film-like member is substantially spaced from said product means by said bottom wall of the respective upper receptacle.

3. A combination as set forth in claim 2 wherein said last-named means comprises a tear string secured to the inside surface of said film-like member between said adjacent receptacles and having an end exposed at one of the ends of said film-like member.

4. A combination as set forth in claim 2 wherein said last-named means comprises a tear string sewed to said film-like member between said adjacent receptacles and having an end exposed at one end of the ends of said film-like member.

5. A combination as set forth in claim 2 wherein said last-named means includes a plurality of aligned perforations in said film-like member between said adjacent receptacles and a finger receiving opening in said film-like member and aligned with said perforations.

6. In combination, a plurality of receptacles having the open ends thereof receiving product means, said filled receptacles being placed in stacked relation, and a heat shrunk tubular film-like member receiving said stacked and filled receptacles to hold said receptacles and product means together, said film-like member having means to permit tearing of said film-like member at least partially across the same to provide easy open means for said tubular film-like member, said last-named means comprising a tear string means having one end secured to one of said product means in the top receptacle and having the other end thereof exposed at one of the ends of said film-like member to be grasped and pulled relative to said film-like member.

References Cited
UNITED STATES PATENTS

| | | | |
|---|---|---|---|
| 2,284,386 | 5/1942 | Frick | 229—86 |
| 2,425,536 | 8/1947 | Hofeldt et al. | 229—15 |
| 2,896,781 | 7/1959 | Demarest | 206—65 |
| 3,016,131 | 1/1962 | Kennedy | 206—45.33 |
| 3,043,490 | 7/1962 | Burnett | 229—51 |
| 3,111,221 | 11/1963 | Chapman et al. | 206—65 |
| 3,118,537 | 1/1964 | Copping | 206—65 |
| 3,184,149 | 5/1965 | Repko | 206—56 |
| 3,197,120 | 7/1965 | Sparks | 229—86 |
| 3,244,348 | 5/1966 | Shaw | 229—51 |

OTHER REFERENCES

Modern Packaging, "Apple In a Sling," October 1958, page 127.

THERON E. CONDON, Primary Examiner.

WILLIAM T. DIXSON, JR., Examiner.